United States Patent [19]
Lakhani

[11] 3,838,543
[45] Oct. 1, 1974

[54] HIGH SPEED CUT-OFF WHEEL

[75] Inventor: Hussain G. Lakhani, Holden, Mass.

[73] Assignee: Norton Company, Worcester, Mass.

[22] Filed: Aug. 24, 1972

[21] Appl. No.: 283,497

Related U.S. Application Data

[63] Continuation-in-part of Ser. No. 40,369, May 25, 1970, abandoned, which is a continuation-in-part of Ser. No. 834,744, June 19, 1969, abandoned.

[52] U.S. Cl. ............................................. 51/206 NF
[51] Int. Cl. ............................................. B24d 5/04
[58] Field of Search ................... 51/206, 207; 125/15

[56] References Cited
UNITED STATES PATENTS

| | | | |
|---|---|---|---|
| 2,094,556 | 9/1937 | Anderson | 51/206 NF X |
| 2,763,105 | 9/1956 | Freely | 51/206 R UX |
| 2,814,918 | 12/1957 | Erickson | 51/206 R |
| 2,826,016 | 3/1958 | Hurst | 51/206 NF |
| 3,208,838 | 9/1965 | Fischer | 51/206 X |
| 3,315,418 | 4/1967 | Zawodni | 51/206 NF |
| 3,487,589 | 1/1970 | Binkley | 51/206 R |

*Primary Examiner*—Harold D. Whitehead
*Attorney, Agent, or Firm*—Arthur A. Loiselle, Jr.

[57] ABSTRACT

A cut-off wheel is produced by off-center bonding entirely within the body of the wheel of at least one glass cloth disc woven from continuous filament glass roving, or from yarn having a twist of no more than 1.5 turns per inch, the effect of which is to increase the modulus of elasticity of the said wheel, thereby elevating the peripheral speed at which the wheel will begin to flutter and vibrate while in the process of cutting.

5 Claims, 5 Drawing Figures

PATENTED OCT 1 1974 3,838,543

INVENTOR
HUSSAIN G. LAKHANI
BY
ATTORNEY

HIGH SPEED CUT-OFF WHEEL

CROSS-REFERENCE TO RELATED APPLICATION

This is a continuation-in-part of application Ser. No. 40,369 filed May 25, 1970, and now abandoned, which in turn was a continuation-in-part of Ser. No. 834,744 filed June 19, 1969, now abandoned.

BACKGROUND OF THE INVENTION

The invention relates to the grinding wheel art and more particularly to that segment of the grinding wheel art concerned with so-called cut-off wheels.

Although abrasive wheels of almost any diameter and thickness dimensions may be used to cut or part materials such as metals, stone, glass, plastics and the like, there are some practical and economically imposed limitations, which are well known to those skilled in the art. For example, a wheel 24 inches in diameter and 1 inch thick can be used to cut steel bar stock or to separate gates and rises from a metal casting, such a wheel would be awkward to use and uneconomical in that it would require a machine with relatively higher power to drive it, it would cause the waste of a substantial amount of material being cut due to the thickness of the wheel, and would produce a very poor quality cut. Ideally the thinner the wheel the more efficient and effective it performs its job. Unfortunately, however, the degree of thinness has been limited in practice due to the lack of resistance of such wheels to forces on the side of the wheels, and a little understood vibrational phenomenon, often called resonant flutter, that occurs at various peripheral speeds depending on the thickness of the wheel, which generally results in breakage of the wheel. A typical cut-off wheel would have a diameter to thickness ratio of greater than 40; more typical and desirable are wheels with diameter to thickness ratios of about 100.

The break resistance of this class of relatively thin abrasive wheels has been greatly enhanced by the incorporation in the body of such wheels, of "reinforcing" discs of nylon, glass or cotton woven cloth made from conventional thread or yarn i.e., spun and/or twisted yarn. It is generally accepted, however, that these "reinforcing" cloths do not in fact reinforce the cut-off wheel in the sense that the inherent strength of the wheel is increased, but rather serve to hold the pieces of the wheel together after it has cracked at the same peripheral speed that the cracking and breakage would have occurred lacking the presence of the cloth material. The incorporation of these materials also fails to have any effect on the speed at which a given cut-off wheel will begin to develop a resonate vibration or so-called flutter; a given wheel specification without any one of these so-called "reinforcing" cloths in it, which begins to flutter in use when the peripheral speed exceeds 15,000 surface feet per minute, will also begin to flutter at the same peripheral speed in use, even when the wheel contains two or even three discs of these so-called reinforcing materials. The phenomenon of flutter is limited to the operation of relatively thin cut-off wheel operation as distinguished from normal cylindrical or other rigid grinding wheels.

The most recent trend in all grinding wheel technology is high speed grinding. The fruits of increased grinding speed are marked increases in production rate, lower wheel costs, and lower labor costs to the wheel user. High speed grinding has been adapted well to other types of grinding operations for example rough grinding like billet grinding and floor stand grinding, and finishing operations like centerless grinding but has not been utilized in the cutting off type of operation, primarily because the cut-off wheels available to the industry at present as a result of the requirement of the thinness, are incapable of operation beyond the presently used 15,000 to 16,000 surface feet per minute because of the dangerous fluttering phenomenon that occurs at speeds in excess of these. Some minor amount of high speed cutting off has been done at peripheral speeds of up to 20,000 surface feet per minute by employing greatly oversized flanges in place of the normal flanges. For example, a typical cut-off wheel 20 inches in diameter and 0.180 inch thick used with the normal 4 inches to 6 inches diameter flanges will flutter and become unsafe and impractical to use at 15,000 surface feet per minute. If this same wheel is mounted with 8 inches flanges it may be used for faster cutting and at lower wheel costs by operating it at peripheral speeds of about 20,000 surface feet per minute. This device is, however, an unhappy compromise. Large flanges greatly limit the usable diameter of the wheel, i.e., the wheel cannot be practically used once it has worn down to a diameter approximately 2 inches greater than the oversized flanges, unless a series or at least one additional set of smaller flanges is made available to the machine operator.

Some minor success in increasing the flutter speed has been attained by increasing the thickness of the wheels. This too, is at best, an undesirable compromise because thicker wheels require more power to cut effectively and waste more of the material being cut.

Another possible approach to improving the situation is to decrease the specific gravity of the wheel. Success using this approach however is highly improbable when one considers the nature of the operation and what one is attempting to accomplish. With the limitations in the types of materials that must be used to make a grinding wheel, particularly the high density abrasive grit material, any significant reduction in the specific gravity of the wheel composition will necessarily result in a wheel of lowered mechanical strength. This resulting decrease in mechanical strength, particularly the decrease in resistance to breakage from centrifugal forces, necessarily prohibits the use of such low density wheels at extremely high speeds.

Still another means for increasing the flutter speed is by way of increasing the modulus of elasticity, or stiffness, of the cut-off wheel. Apparently, whatever attempts have beem made by the grinding wheel industry in this direction, have been unsuccessful as evidenced by the fact that cut-off wheels are not available to the metal working density that will operate significantly above 16,000 surface feet per minute without the use of such unsatisfactory compromises as greatly oversized flanges or wheels of impractical thickness.

SUMMARY OF THE INVENTION

The invention provides the metal working industry with a method for controlling flutter in a cut-off wheel and a structure for a cut-off wheel that will operate safely and effectively at peripheral speeds in excess of 16,000 surface feet per minute without the use of oversized flanges. This method for controlling flutter has been accomplished by increasing the modulus of elasticity of the wheel and provides a structure to effect the required stiffening through the incorporation therein of glass cloth woven of continuous filament glass roving, or yarn with a twist of no more than 1.5 turns per inch. It has been discovered that such cloth when embedded entirely within the body of the wheel increases the modulus of elasticity of the wheel because the strands of the cloth, when thus locked in the wheel structure do not stretch or kink when the wheel is subjected to the side forces created by the resonant vibration phenomenon which occurs at high speeds. This then allows the woven roving cloth, or the cloth made from yarn having a twist of no more than 1.5 turns per inch, to reinforce the wheel relative to elastic deformation and impart rigidity to the overall wheel structure. The more conventional glass cloth, which is woven of spun and/or twisted thread or yarn usually having four to 10 twists per inch, is stretchable and therefore cannot impart any additional rigidity to the wheel structure. If one cloth or disc of woven roving or cloth made with yarn of less than 1.5 twist is used, it must be located at least slightly displaced from the center of the thickness of the wheel. If two or more of such cloth discs are used they should be located symmetrically about the center of the wheel thickness and below the surface of the side faces. The maximum attainable flutter-free peripheral speed in use is determined by a combination of wheel thickness, the specific gravity of the wheel, the number of discs of woven roving, or cloth woven from yarn having a twist of no more than 1.5 turns per inch, incorporated therein and the respective orientation of the strands of one disc relative to the strands of another disc.

DESCRIPTION OF THE PREFERRED EMBODIMENTS

I have discovered a method and means for increasing the peripheral speed at which conventional cut-off wheels may be driven before they will begin to flutter, thereby greatly increasing the peripheral speed at which such wheels can be used. This has been made possible because I have found a method for controlling resonant flutter in a cut-off wheel to permit operation at higher speeds which is embodied in a way to increase the modulus of elasticity, or stiffness, of the wheels without resorting to such devices as increasing the wheel thickness or using greatly oversized flanges. I have accomplished this by incorporating entirely within the body of the cut-off wheel at least one cloth disc woven from so-called continuous filament glass roving, or from yarn having no more than 1.5 twist per inch. The terms "yarn" and "roving" are terms of art which have particular meaning. With respect to continuous filament glass cloth the strands or bundles of continuous filaments making up the warp and weft may be twisted, in which case they are called "yarn," or essentially untwisted and are designated as "roving." Most conventional continuous filament glass yarn has from four to 10 twists per inch. Roving on the other hand is essentially untwisted although it's not uncommon to find roving with one twist in about 30 inches. The drastic effect on the stiffness of the cut-off wheels resulting from the herein described incorporation therein of glass cloth woven from continuous filament roving or yarn having not more than 1.5 twist per inch, will be more clearly understood and appreciated from the foregoing discussion with reference to the attached drawings.

Figure 1:
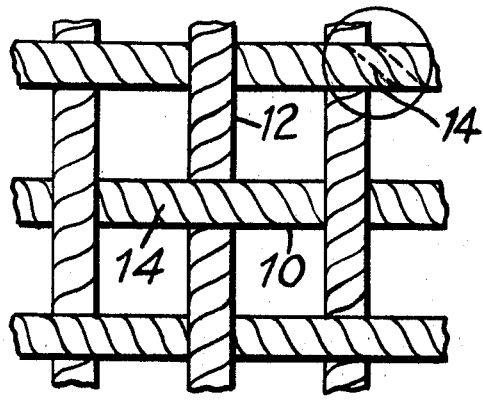
FIG. 1 is a plan view of a glass cloth woven of conventional spun and/or highly twisted yarns or threads.

As mentioned previously, the use of glass cloth to reinforce cut-off wheels in the sense of holding them together after they have cracked, is well known in the art. This type of glass cloth, however was made from strands of highly twisted warp and weft elements i.e., four twists per inch or more, and whether woven from continuous filament twisted yarn or staple yarn, such glass cloth has no effect on the stiffness or modulus of elasticity of a given cut-off wheel. The construction of such glass cloth is shown in its simplest form in FIG. 1 where the warp 12 and the weft 10 are made up of a plurality of highly twisted strands of continuous glass filaments one of which is denoted by reference number 14. When such a highly twisted yarn is subjected to tensile forces, the twisted strands 14 tend to straighten out as shown exaggerated in the circled portion of the uppermost warp 10 in FIG. 1, the shift of the orientation of the strands 14 being shown by the broken lines. This property of the warp and weft made from conventional spun or twisted yarn or thread to stretch when subjected to tensile forces, prevents this type of cloth from imparting rigidity or stiffness to a cut-off wheel when such cloth is molded entirely within the wheel. The commonly used types of yarn are usually made up of more than a single twisted strand of continuous filaments as shown in FIG. 1, e.g., two or three strands may be twisted together; this is called a "singles" yarn, with its twist going in one direction only. Further, two or more "singles" yarn may be twisted together forming a thread or yarn, with the twists then going in opposite directions; these also stretch and will kink during flutter when embedded in a cut-off wheel in the manner described in connection with the twisted singles yarn in the cloth of FIG. 1.

Figure 2:
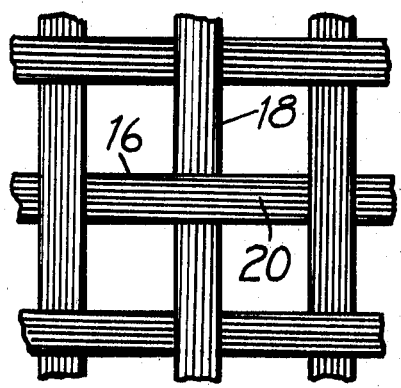
FIG. 2 is a plan view of a glass cloth woven of essentially non-twisted yarn or so-called roving.
Figure 3:
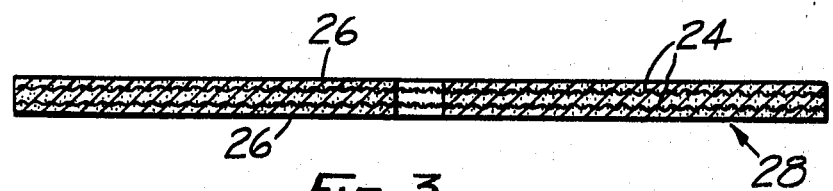
FIG. 3 is a sectional view of an organic polymer bonded cut-off wheel showing two glass cloth discs located therein.
Figure 5:
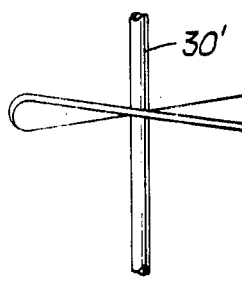
FIG. 5 is a diagrammatic top view of the wheel and work shown in FIG. 4 when the wheel is driven at a speed that produces resonant flutter therein.

Conversely, the woven roving illustrated in FIG. 2 with the warp 16 and the weft 18 being made up of essentially untwisted continuous multifilament strands 20, or so-called roving, does impart a degree of additional stiffness to a wheel when embedded entirely within the body of the wheel by virtue of the inability for the warp and weft elements of the cloth to stretch or elongate or kink when subjected to tensile and compression forces such as are produced during resonant flutter conditions. The same is true of a slightly twisted yarn as long as the amount of twist does not exceed 1.5 per inch. The effect on the modulus of elasticity of a typical cut-off wheel when a conventially twisted yarn cloth is compared with a roving or slightly twisted yarn is shown in Table I. The particular cut-off wheel used was a conventional phenol-formaldehyde condensation resin bonded, 24 grit aluminum oxide wheel 20 inches in diameter and 0.180 inch thick. The wheel was constructed as shown in FIG. 3 with two discs of glass cloth 24 located as illustrated within the wheel 28. Shown also in Table I is the increase in the wheel speed at which flutter sets in, as a result of the increased modulus of elasticity when using flanges 6.67 inches in diameter.

TABLE I

| No. of Cloth Discs per Wheel | Type of Yarn in Cloth* | Modulus of Elasticity | Flutter Speed | Recommended Operating Speed |
|---|---|---|---|---|
|  |  | psi | sfpm | sfpm |
| None | — | $2.6 \times 10^6$ | 16,000 | 14,000 |
| 2 | conventional (4 twists/inch) | $2.6 \times 10^6$ | 16,000 | 14,000 |
| 2 | Low twist (1 twist/inch) | $3.3 \times 10^6$ | 23,000 | 21,000 |

*Both cloths located below the side surfaces of the wheel.

The significance of an increase in flutter speed from 16,000 to 23,000 surface feet per minute can be clearly appreciated when one considers the effect on the G ratio, i.e., the ratio of metal removed to wheel wear. Typical data showing the effect on G ratio of wheel speed is shown in Table II.

TABLE II

| Wheel Speed | G-Ratio |
|---|---|
| 11,000 sfpm | 2 |
| 14,000 sfpm | 4 |
| 18,000 sfpm | 5 |
| 22,000 sfpm | 18 |

The grinding efficiency as defined by G ratio, increases at a very rapid rate as the operating speed of the wheel is increased above 18,000 surface feet per minute. In addition to the use of cloth made from yarn having less than 1.5 twist per inch, or the use of woven roving glass cloth, a very fundamental and required element of my invention is the location of the glass cloth. In order to attain the desired high moduli of elasticity, the glass cloth or cloths must be located beneath and relatively parallel to the side surfaces of the wheel. One cloth disposed exactly in the center of the wheel serves no function, but one cloth may be used to advantage if displaced from the center somewhat to produce some stiffening in order to control flutter. If more than one cloth is used, for example 2, an arrangement such as that illustrated in FIG. 3 is preferred wherein the two glass cloth discs 24 are wholly embedded in the wheel approximately equidistant from the two side surfaces 22 and 26 of the wheel 28 and approximately equidistant from each other. It is essential that the discs 24 be embedded within the body of the wheel to properly bond the rovings or slightly twisted yarn in the wheel so that the warp and weft cannot kink up or break loose from their bonded positions in the wheel. Since the roving or only slightly twisted yarn cannot elongate under tension, the embedded warp and weft elements of my invention serve to stiffen the wheel to increase the modulus of elasticity of the structure whereby to raise the threshold speed at which flutter can begin.

The amount of increase in the modulus of elasticity increases as the number of woven roving glass cloth discs, or discs in the wheel are increased which are made from low-twist yarn and which are located other than in the center plane of the wheel.

TABLE III

| No. of Cloth Discs (yarn with 1 twist/inch) | Modulus of Elasticity |
|---|---|
| None | $2.6 \times 10^6$ |
| 1 (displaced somewhat from center plane) | $3.0 \times 10^6$ |
| 2 | $3.3 \times 10^6$ |

Table III shows the effect on modulus of elasticity as the number of cloth discs contained in the wheels increase from none to 2. The wheel used was a conventional phenol-formaldehyde condensation resin bonded, aluminum oxide containing wheel 20 inches in diameter and 0.165 inch thick. The principal limitation on the number of cloth discs that may be employed in such a manner, is the effect that any given number of such discs has on the grinding properties of the wheel. A cut-off wheel of the order of 0.165 inch in thickness usually will not tolerate more than two discs contained within the wheel without having an adverse effect on the grinding properties. However, if the wheel thickness is increased then additional numbers of cloth discs may be used without drastically changing the grinding quality of the wheel.

A further increase in the peripheral speed of the invention wheels is facilitated, in wheels containing 2 or more cloths of low twist yarn or woven-roving glass cloth discs, if the warp and weft of one disc are oriented in a direction 45° to the warp and weft of the next adjacent disc.

Figure 4:
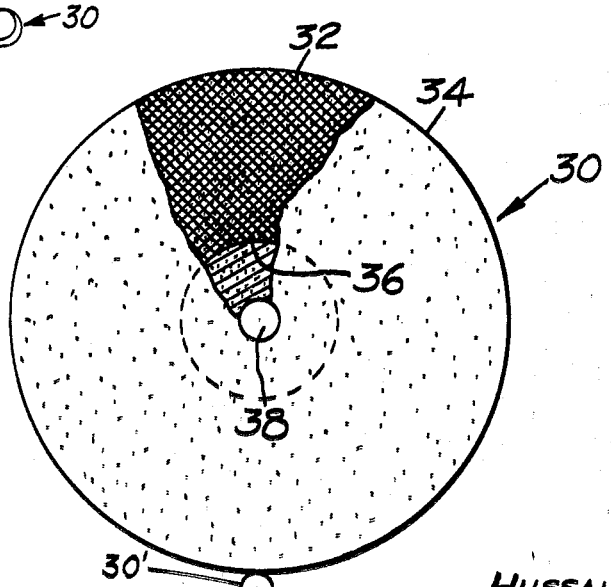
FIG. 4 is a cut-off wheel with part of one side surface cut away to show a glass cloth disc of woven roving located within the abrasive-organic polymer bond matrix, while stationary in this view it shows the wheel positioned above a workpiece.

I have found that the successful practice of my invention does not necessitate that the glass cloth discs in a given cut-off wheel be of such a size that they go from the periphery of the wheel all the way to the arbor hole. It is only necessary that the discs be of such a size that they go from the periphery of the wheel to a point just under the flanges to be used on that particular wheel size. The reason for this being, as mentioned previously, that the flanges themselves impart rigidity or stiffness to the wheel as a whole by virtue of increasing the stiffness of that portion of the wheel confined by the two tightened flanges. FIG. 4 shows a typical cut-off wheel 30 positioned over a workpiece 30' with a portion of one side face cut away to expose the woven roving glass cloth 32 which extends from the periphery of the wheel 34 to the point 36 some distance from the arbor hole 38. The rule used to determine flange size requirements for a wheel of a given diameter, is that the flange diameter should be approximately one-fourth the diameter of the wheel. Therefore, if the wheel 30 shown in FIG. 4 is 36 inches in diameter then the recommended flange size would be about 9 inches and the woven roving glass cloth 32 need only occupy an area within the wheel from the periphery to a point 36 which in the case of a 36 inch wheel would be a circle having a diameter of about 8½ inches. When 9 inch flanges are used on such a wheel, the glass cloth 32 would extend one-fourth inch under the periphery of the flanges. The advantage in not having to use glass cloth that extends from the periphery to the arbor hole is one of economics. For example, in the case of a 36 inch wheel using a 9 inch set of flanges, the 8½ inch glass cloth disc died out of the large 36 inch blank used in the foregoing example, may be used in a cut-off wheel of smaller diameter, for example 6 inches or 8 inches diameter wheels.

I have discovered the method of controlling flutter by controlling the modulus of elasticity of the cut-off wheel and the roving or slightly twisted yarn forming the warp and weft of the completely embedded discs of my invention may be used to increase the modulus of elasticity and resonant flutter speed, of cut-off wheels bonded with any organic polymeric bonding material such as the phenol-formaldehyde condensation resins mentioned above, unsaturated polyesters, polyimides, polybenzimidazols, natural and synthetic rubbers, polyurethanes, shellac, and the like, and combinations of these. However, the successful exploitation of my invention will rely to some degree on the application of the basic and well known fundamentals of adhesion. For example, silane treated glass is a highly effective adhesion promoter; for optimum adhesion between the glass and the organic bond material or matrix of the wheel, the glass should first be coated with a resin preferably a liquid resin or a solid resin in solution, which is compatible with the organic polymeric material to be used as the wheel bond or matrix; the wheel bond itself, ideally should have a melt viscosity sufficiently low to allow the bond to efficiently wet the resin coated glass cloth. The technology of adhesion is well known to those skilled in the art and constitutes no part of the instant invention except in that, negligence in applying the basic principles of adhesion, may result in decreasing the effectiveness of my invention, e.g., if one uses a silane treated glass which has been coated with a liquid one-stage phenol-formaldehyde condensation product, and then uses as the bonding agent for the abrasive particles, an extremely high molecular weight two-stage phenol-formaldehyde condensation product which has as a result an extremely high melt viscosity, then the wetting characteristics of the abrasive bond polymer will be poor and the resultant improvement in modulus of elasticity would most likely be diminished as a result of adhesive failure between the glass cloth and the abrasive bonding agent or matrix.

EXAMPLE I

A high speed cut-off wheel 20 inches in diameter, 0.180 inch thick and having a 1 inch arbor hole was made in the following manner:

The organic polymer bond or matrix material was prepared first by blending together, in a conventional twin-shell V-blender, 5.08 pounds of powdered two-stage phenol-formaldehyde condensation resin known as BRP-5417 manufactured and sold by Union Carbide Corporation, and 4.92 pounds of particulate iron pyrites.

A 20 pound mix of 24 grit aluminum oxide abrasive and the prepared resin-pyrites bond was made by placing 14.98 pounds of said abrasive into a mechanical mixer, adding to the abrasive 0.61 pounds of the liquid one-stage phenol-formladehyde condensation resin BRL-9332 manufactured and sold by Union Carbide Corporation, mixing the two materials so that the abrasive became substantially coated with the liquid resin, and finally adding to the liquid resin wetted abrasive 4.41 pounds of the prebatched powdered resin-pyrites mixture. This combination was mixed until the wetted abrasive and powdered bond were uniformly blended.

A steel mold set-up was assembled which consisted of a mold band 2 inches high and with an inside diameter of approximately 20 inches, a bottom plate and top plate each 0.75 inch thick and containing a centrally located arbor hole, and a 2 inch steel arbor. Into the mold containing the bottom plate and positioned arbor, was place 1.469 pounds of the previously prepared abrasive-bond mix, which was spread to form a loose coating of even thickness on the bottom plate of the mold set-up. A glass cloth disc 20 inches in diameter with a one inch hole and woven of yarn having about one twist per inch having six weft and six warp yarns to the square inch and weighing 11.2 ounces/square yard, was placed on top of the uniformly spread abrasive-bond mix. To this was added a second 1.469 pound portion of abrasive-bond mix which was spread uniformly and leveled in the mold. A second glass cloth disc identical to the first, was placed in the mold and on top of the second layer of abrasive-bond mix. This disc was placed so that its warp and weft directions were 45° to the directions of the warp and weft of the first cloth. A third and final 1.469 pound quantity of abrasive-bond mix was placed in the mold, on top of the second cloth, and leveled. The top plate was positioned in the mold. A shimming ring of sheet steel was placed on the top plate, the ring having an outside diameter of 16 inches, an inside diameter of 12 inches and a thickness of 0.320 of an inch.

The completely assembled mold was placed in a hydraulic press and sufficient pressure applied at room temperature to cause the shimmed mold to close until the upper deck of the press came to rest on the upper surface of the mold band. The pressure was released, the mold set-up removed and disassembled and the pressed uncured wheel, measuring 20 inches in diameter, 0.180 inch thick and containing a one inch arbor hole, was removed and placed on an aluminum oxide batt (plate).

Two additional uncured wheels were prepared in the same manner. These three wheels and three batts were stacked one on top of the other. The top wheel, which was exposed to the atmosphere, was covered with another batt upon which was placed 650 pounds of static weight. The complete, weighted assembly was placed in a box type mechanically convected oven and subjected to a heat treatment consisting of an 18 hour rise from room temperature to 175° C. and a temperature dwell at 175° C. of about 16 hours. This thermoset the phenol-formaldehyde resins. The temperature of the wheels was then decreased to room temperature. The resulting wheels were 0.180 inch thick.

The average modulus of elasticity of these wheels was $3.3 \times 10^6$ pounds per square inch and the average flutter speed in use was 23,000 surface feet per minute using 6.67 inch diameter flanges.

In addition to providing a means for using cut-off wheels of more conventional thicknesses at higher speeds without flutter, my invention also provides a means by which thinner wheels may be used at more conventional peripheral speeds. Generally speaking, thinness in a cut-off wheel is highly desirable. There are several reasons that make this true among the more important of which are the fact that when cutting expensive materials such as titanium, germanium, silicon, and the like the thinner the wheel the less of these expensive materials is wasted in the cutting; the thinner the cut-off wheel the less power is required to make the cut, the wheels are freer cutting, and the resulting cut is of higher quality and free of burn; the thinner the wheel the quicker the cut is completed; and, the thinner the wheel the lower is the cost of the wheel. The currently used conventional cut-off wheels are in many cases thicker than is desirable; this excessive thickness has, however, been necessitated by the vibration or flutter phenomenon that occurs when thinner wheels of conventional design are used at, for example 10,000 to 12,000 surface feet per minute. By employing the wheel design concept of my invention, cutting off operations currently being accomplished at 12,000 surface feet per minute may be accomplished by using thinner wheels.

It should be understood that the simple design of the woven roving shown in FIG. 2 should not be construed as a limitation. The design or pattern of the cloth is immaterial to the successful practice of my invention as long as all of the strands or roving (or low-twist yarn) making up the cloth do not travel in the same direction, i.e., the warp and weft must form an angle, with each other, that is greater than zero but need not necessarily be a 90° angle as shown in FIG. 2. A further variant in cloth design is that consisting of radially oriented strands of roving (or low twist yarn) through which has been woven either a single strand of roving (or low twist yarn) in the form of a flat spiral, or numerous concentric circles emanating from the central point at which the radial strands meet. Furthermore, the warp and weft need not be woven in the more conventional sense as shown in FIG. 2, i.e., the warp and weft need not alternately pass over and under each other; they may be simply placed with all of the weft strands on top of the warp strands or some weft strands on top and some underneath the warp strands, being fixed in place by the partially cured resin used to coat the cloth. Because no generic name is known to me, which would include all of the foregoing types of cloth design, I have chosen to use the word "woven" to describe all such designs. Thus, the term "woven," as used in the appended claims, means woven cloth in the more conventional sense, but is also intended to include those cloth designs wherein the so-called warp and weft strands are not related to one another in an over and under relationship.

The preceding description of my invention is intended to be illustrative and for the purpose of facilitating a clearer understanding of the invention, and in no way is intended to be limiting. One skilled in the art may become aware of numerous modifications of my invention, particularly with respect to combining the concepts of my invention with such parameters as oversized wheel flanges, wheel thickness to diameter ratios, and abrasive grit bonding agents with inherently improved modulus of elasticity properties, to provide wheels capable of operating at extremely high speeds.

What is claimed is:

1. A cut-off wheel having a diameter to thickness ratio of at least 40 to 1 comprising a structure in which the modulus of elasticity has been increased to make it capable of cutting at higher peripheral speeds before the onset of resonant flutter of the wheel, said wheel including abrasive grains bonded in an organic polymer matrix to form a body having a periphery and side faces, said wheel including at least one woven glass cloth disc having warp and weft elements surrounded by the bonding matrix and disposed to be entirely within the body, said at least one disc being spaced from and parallel to the side faces of the wheel, said at least one disc being displaced from the center plane of the thickness dimension of the wheel and said at least one disc being characterized in that said warp and weft elements each consists essentially of a bundle of continuous filaments having a twist of no more than 1.5 per inch.

2. The cut-off wheel of claim 1 containing at least two of said woven glass cloth discs which are oriented in the wheel with the warp and weft of one disc at a 45° angle to the warp and weft of the next adjacent disc.

3. The cut-off wheel of claim 1 wherein the said organic polymer matrix is a phenol-formaldehyde condensation resin.

4. The cut-off wheel of claim 1 wherein the said organic polymer matrix is a mixture of hydrocarbon rubber and a phenol-formaldehyde condensation resin.

5. The cut-off wheel of claim 1 wherein the said organic polymer matrix is shellac.

* * * * *